(12) United States Patent
Reid

(10) Patent No.: US 9,195,009 B2
(45) Date of Patent: Nov. 24, 2015

(54) MICROFLUIDIC OPTICAL SWITCHING DEVICE AND METHOD

(71) Applicant: AMO Wavefront Sciences, LLC., Santa Ana, CA (US)

(72) Inventor: Devon E. Reid, Albuqueque, NM (US)

(73) Assignee: AMO Wavefront Sciences, LLC, Santa Ana, CA (US)

( * ) Notice: Subject to any disclaimer, the term of this patent is extended or adjusted under 35 U.S.C. 154(b) by 0 days.

(21) Appl. No.: 14/302,593

(22) Filed: Jun. 12, 2014

(65) Prior Publication Data

US 2014/0369647 A1    Dec. 18, 2014

Related U.S. Application Data

(60) Provisional application No. 61/834,278, filed on Jun. 12, 2013.

(51) Int. Cl.
G02B 6/35 (2006.01)

(52) U.S. Cl.
CPC .................................. *G02B 6/3538* (2013.01)

(58) Field of Classification Search
CPC ....................................................... G02B 6/3538
See application file for complete search history.

(56) References Cited

U.S. PATENT DOCUMENTS

| 4,245,886 A * | 1/1981 | Kolodzey et al. ................ 385/19 |
| 6,445,845 B1 * | 9/2002 | Sakata et al. .................... 385/18 |

* cited by examiner

*Primary Examiner* — Jerry Rahll
(74) *Attorney, Agent, or Firm* — Abbott Medical Optics Inc.

(57) ABSTRACT

Improved systems and methods for optical switching are provided. These devices and methods can be used to improve the effectiveness of a wide variety of different optical systems and techniques. One embodiment provides a device and method for optical switching using a microfluidic chamber and droplets of liquid. Specifically, the droplets of liquid are controllably passed through the microfluidic chamber to switch the passing of light between different optical outputs. Thus, the optical switch can switch the light from one output to another by controllably passing droplets of liquid through the microfluidic chamber.

23 Claims, 5 Drawing Sheets

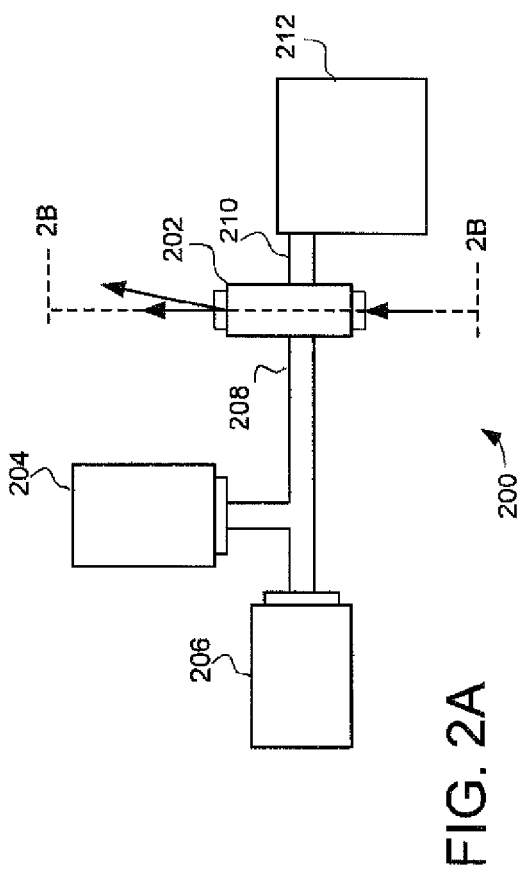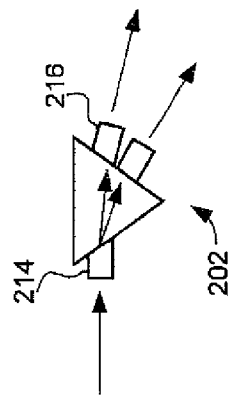
FIG. 2A
FIG. 2B

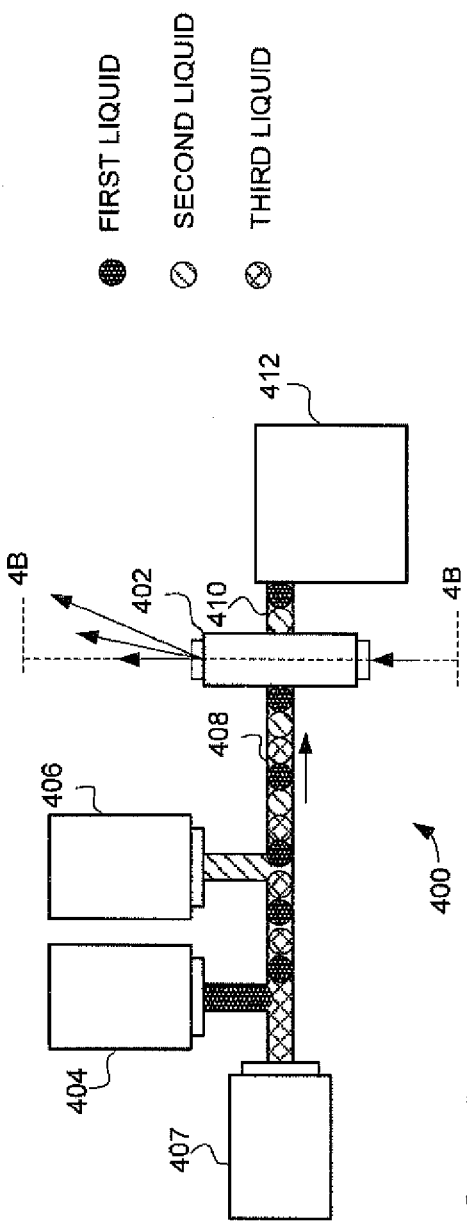
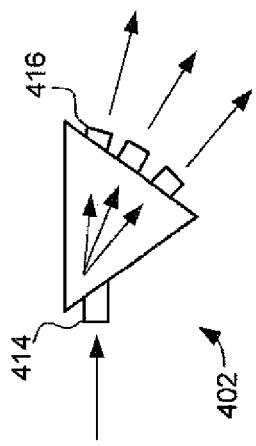
FIG. 4A
FIG. 4B

MICROFLUIDIC OPTICAL SWITCHING DEVICE AND METHOD

CROSS-REFERENCES TO RELATED APPLICATIONS

This application claims priority to U.S. provisional application No. 61/834,278 filed on Jun. 12, 2013, the entire contents of which are incorporated herein by reference.

TECHNICAL FIELD

Embodiments of the present invention generally relate to optics, and particularly to optical switching techniques.

BACKGROUND OF THE INVENTION

Optical systems are used in a variety of applications. For example, optical switches are used in a variety of modern communication and information systems, as well in various testing and diagnostic applications. In many cases, optical systems require the ability to switch light between one or more different optical paths.

Conventional optical switches have typically had a variety of limitations. For example, some optical switches suffer from excessive power requirements, while others are extremely complex and costly, which can limit the practicability of their use in certain applications.

Hence, there is a continuing need for improved optical switches and techniques.

BRIEF SUMMARY OF THE INVENTION

Embodiments of the present invention generally provide improved devices and methods for optical switching that substantially obviate one or more problems due to limitations and disadvantages of the related art. These devices and methods can be used to improve the effectiveness of a wide variety of different optical systems and techniques. One embodiment provides a device and method for optical switching using a microfluidic chamber and droplets of liquid. Specifically, the droplets of liquid are controllably passed through the microfluidic chamber to switch the passing of light between different optical outputs. For example, an optical light switch can comprise a microfluidic chamber, an optical input coupled to the microfluidic chamber, a plurality of optical outputs coupled to the microfluidic chamber, and an inlet coupled to the microfluidic chamber. The inlet is configured to controllably pass a series of individual droplets of a first liquid into the microfluidic chamber, with each droplet separated from other of the series of individual droplets of the first liquid. The microfluidic chamber, the optical input, and the plurality of optical outputs are configured such that light entering the microfluidic chamber from the optical input passes to a first of the plurality of optical outputs when a droplet of the first liquid is in the microfluidic chamber, and passes to a second of the plurality of optical outputs when a droplet of the first liquid is not in the microfluidic chamber multifunction. Thus, the optical switch can switch the light from one output to another by controllably passing droplets of liquid through the microfluidic chamber.

In another embodiment, the optical switch comprises a microfluidic chamber, an optical input coupled to the microfluidic chamber, a first optical output coupled to the microfluidic chamber, a second optical output coupled to the microfluidic chamber, a first droplet generator configured to generate a first series of individual droplets of a first liquid, the first liquid having a first index of refraction, a second droplet generator configured to generate a second series of individual droplets of a second liquid, the second liquid having a second index of refraction different than the first index of refraction, and an inlet coupled to the microfluidic chamber, the first droplet generator and the second droplet generator, the inlet configured to interlace the first series of individual droplets with the second series of individual droplets, the inlet further configured to controllably pass the interlaced first and second series of individual droplets into the microfluidic chamber. In this embodiment, the microfluidic chamber, the optical input, and the plurality of optical outputs are configured such that light entering the microfluidic chamber from the optical input passes to a first of the plurality of optical outputs when a droplet of the first liquid is in the microfluidic chamber and passes to a second of the plurality of optical outputs when a droplet of the second liquid is in the microfluidic chamber. Thus, the optical switch can switch the light from one output to another by controllably passing droplets of first liquid and second liquid through the microfluidic chamber.

This summary and the following detailed description are merely exemplary, illustrative, and explanatory, and are not intended to limit, but to provide further explanation of the embodiments of the invention as claimed. Additional features and advantages of the invention will be set forth in the detailed descriptions, and in part, will be apparent from the description, or may be learned by practicing various embodiments of the invention. The objectives and other advantages of the invention will be realized by the structures and methods particularly pointed out in the written description and claims as well as the accompanying drawings.

BRIEF DESCRIPTION OF THE DRAWINGS

FIGS. 2A and 2B are schematic diagrams of an optical switch according to an embodiment of the invention;

FIGS. 4A and 4B are schematic diagrams of an optical switch according to another embodiment of the invention.

DETAILED DESCRIPTION OF THE INVENTION

Figure 1:
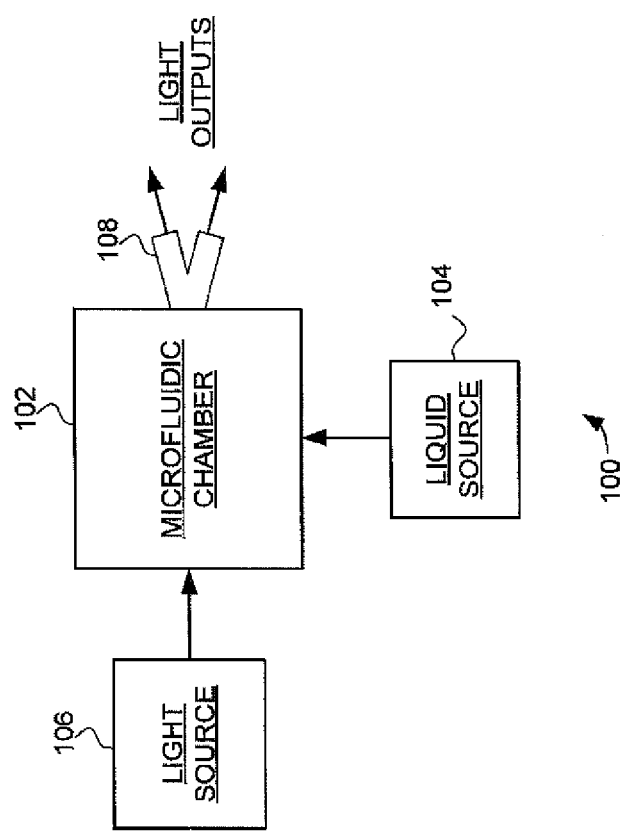
FIG. 1 is a functional diagram of an optical switch according to an embodiment of the invention.

The figures and descriptions have been simplified to illustrate elements that are relevant for a clear understanding of embodiments of this invention, while eliminating, for the purpose of clarity and brevity, many other elements found in typical ophthalmic techniques, systems, methods, devices, lenses, and implantable optic apparatuses. Those of ordinary skill in the art may thus recognize that other elements and/or steps are desirable and/or required in implementing the present invention. However, because such elements and steps are well known in the art, and because they do not necessarily facilitate a better understanding of the present invention, those elements and steps are not discussed. This disclosure is directed to all applicable variations, changes, and modifications known to those skilled in the art. As such, the following detailed descriptions are merely illustrative and exemplary in nature and are not intended to limit the embodiments of the subject matter or the uses of such embodiments. As used in this application, the terms "exemplary" and "illustrative"

mean "serving as an example, instance, or illustration." Any implementation described as exemplary or illustrative is not meant to be construed as preferred or advantageous over other implementations. Further, there is no intention to be bound by any expressed or implied theory presented in the preceding background of the invention, brief summary, or the following detailed description.

Embodiments of this invention generally provide improved devices and methods for optical switching. These devices and methods can be used to improve the effectiveness of a wide variety of different optical systems and techniques. One embodiment provides a device and method for optical switching using a microfluidic chamber and droplets of liquid. Specifically, the droplets of liquid are controllably passed through the microfluidic chamber to switch the passing of light between different optical outputs. For example, an optical light switch can comprise a microfluidic chamber, an optical input coupled to the microfluidic chamber, a plurality of optical outputs coupled to the microfluidic chamber, and an inlet coupled to the microfluidic chamber. The inlet is configured to controllably pass a series of individual droplets of a first liquid into the microfluidic chamber, with each droplet separated from other of the series of individual droplets of the first liquid. The microfluidic chamber, the optical input, and the plurality of optical outputs are configured such that light entering the microfluidic chamber from the optical input passes to a first of the plurality of optical outputs when a droplet of the first liquid is in the microfluidic chamber and passes to a second of the plurality of optical outputs when a droplet of the first liquid is not in the microfluidic chamber multifunction. Thus, the optical switch can switch the light from one output to another by controllably passing droplets of liquid through the microfluidic chamber.

Turning to the drawings, FIG. 1 illustrates a simplified functional diagram of an optical switch 100 according to an embodiment of this invention. The optical switch 100 comprises a microfluidic chamber 102, a liquid source 104, a light source 106, and light outputs 108. In general, the optical switch 100 operates by controllably passing droplets of liquid from the liquid source 104 through the microfluidic chamber 102. Specifically, the droplets of liquid are controllably passed through the microfluidic chamber 102 to switch light between different light outputs 108.

To facilitate optical switching, an inlet is coupled to the microfluidic chamber 102. The inlet is configured to receive and controllably pass a series of individual droplets of a first liquid from the liquid source 104 into the microfluidic chamber 102, with each droplet separated from other of the series of individual droplets of the first liquid. Thus, the microfluidic chamber 102 switches from containing the first liquid to not containing the first liquid as the droplets are sequenced through the microfluidic chamber 102. Furthermore, the microfluidic chamber 102 is configured such that light entering the microfluidic chamber 102 from the optical input passes to a first of the plurality of optical outputs 108 when a droplet of the first liquid is in the microfluidic chamber 102, and passes to a second of the plurality of optical outputs when a droplet of the first liquid is not in the microfluidic chamber 102. Thus, the optical switch 100 can switch the light from one output to another of light outputs 108 by controllably passing droplets of liquid through the microfluidic chamber 102.

In some embodiments, the droplets in the series of individual droplets of the first liquid are each separated by a second liquid. For example, by interlacing the first series of individual droplets with the second series of individual droplets, and controllably passing the interlaced first and second series of individual droplets into the microfluidic chamber 102. This can be accomplished by emulsifying the first liquid with the second liquid, thereby creating alternating series of droplets that are controllably passed into the microfluidic chamber 102. In one such embodiment, each series of droplets is in the form of a monodisperse emulsion. In these various embodiments, light entering the microfluidic chamber 102 propagates to the first optical output 108 when a droplet of the first liquid is in the microfluidic chamber 102. In contrast, light entering the microfluidic chamber 102 passes to the second optical output 108 when a droplet of the second liquid is in the microfluidic chamber 102. These embodiments are implemented using liquids with sufficiently different indices of refraction. Specifically, the first liquid can be selected to have an index of refraction to cause the light to refract to the first output, while the second liquid has an index of refraction selected to cause the light to refract to the second output. A variety of different types of liquids could be used, and more detailed examples will be discussed in greater detail below.

In other embodiments, the droplets in the series of individual droplets of the first liquid are each separated by gas bubbles. In these embodiments, light entering the microfluidic chamber 102 passes to the first optical output 108 when a droplet of the first liquid is in the microfluidic chamber 102. In contrast, light entering the microfluidic chamber 102 passes to the second optical output 108 when a gas bubble is in the microfluidic chamber 102. Again, this can be accomplished using a liquid with an index of refraction that is selected to cause a different amount of refraction compared to that caused by the gas bubbles.

In yet other embodiments, three optical outputs are provided and the droplets in the series of individual droplets of the first liquid are separated by droplets of a second liquid and droplets of a third liquid. In these embodiments, light entering the microfluidic chamber 102 passes to the first optical output 108 when a droplet of the first liquid is in the microfluidic chamber 102. Likewise, light entering the microfluidic chamber 102 passes to the second optical output 108 when a droplet of the second liquid is in the microfluidic chamber 102, and passes to a third optical output 108 when a droplet of the third liquid is in the microfluidic chamber 102. Again, such embodiments are implemented using liquids with sufficiently different indices of refraction. Specifically, the first liquid has an index of refraction selected to cause the light to refract to the first output, while the second liquid has an index of refraction selected to cause the light to refract to the second output, and the third liquid has an index of refraction selected to cause the light to refract to the third output.

In any of these cases, the geometry of the microfluidic chamber 102 and the difference in the indexes of refraction of liquids and/or gasses are such that light will refract, propagate, and couple to only one optical output at any instant.

In some embodiments, the optical switch 100 additionally comprises conditioning optics. Such conditioning optics can be added at the optic input and/or optical outputs of the microfluidic chamber 102. Examples of conditioning optics can include collimating and focusing lenses, graded index fiber lenses, antireflective coatings, waveguides, or more complex components for controlling polarization, amplification, or other properties. For example, conditioning optics can include a lens configured to guide light from input optical waveguides to the microfluidic chamber 102. In other examples the conditioning optics can be implemented with lenses configured to guide light from the optical outputs and into the output optical waveguides.

In some embodiments, the microfluidic chamber 102 is constructed monolithically using any of a variety of fabrication techniques. For example, the optical switch 100 can be formed by patterning fused silica using photolithography. Of course, other techniques could also be used, such as other subtractive or additive manufacturing methods. As one specific example, micro-assembly of discrete components may be used in some devices. Likewise, other materials such as polydimethylsiloxane (PDMS) may also be used.

In some embodiments, coatings are added to the optical switch 100 to modulate the affinity of the chamber to the liquids in the microfluidic chamber. For example, coatings may be applied to the microfluidic chamber 102 to control the wetting parameters between the chamber 102 and the liquids. Typically, these coatings would be selected to best operate with the liquids used in the optical switch 100 (e.g., the first liquid, second liquid, and/or third liquid). For example, these coatings can be selected to maintain the quality of the emulsions passed through the switching chamber.

In some embodiments, the inlets of the optical switch 100 are coupled to one or more droplet generators. In general, the droplet generators are configured to generate the series of individual droplets that are controllably passed through the microfluidic chamber 102. As some examples, a first droplet generator can be configured to generate the series of individual droplets of the first liquid, a second droplet generator can be configured to generate the series of individual droplets of the second liquid, and a third droplet generator can be configured to generate the series of individual droplets of the third liquid. In other cases a single droplet generator can be used to generate multiple series of droplets. In other cases a single droplet generator creates drops of a first liquid within a stream of a second liquid, with the interlacing/emulsification of the liquids occurring as the droplets of the first liquid are formed.

The droplet generators can be implemented with a variety of different types of mechanisms. For example, the droplet generators can utilize a shear force applied to the liquid to generate the series of droplets from the liquid. Other droplet generators can use controlled piezoelectric displacement applied to the liquid to generate the series of droplets. Furthermore, the droplet generators can use a variety of different configurations relative to the inlet. For example, the droplet generator can be implemented with a cross-flow, T-junction, or other configuration allowing for the creation of monodisperse emulsions in microfluidic channels.

It should be further noted that multiple optical switches such as optical switch 100 can be implemented together to provide increased switching flexibility. For example, multiple optical switches can be implemented in series and/or parallel configurations to provide the ability to switch between additional optical paths.

For example, two switches that each provide 1×2 switching can be connected in series to effectively provide 1×3 switching. Likewise, two switches that each provide 1×3 switching can be connected in series to effectively provide 1×5 switching. In general such an implementation can be provided by coupling an output of a first microfluidic chamber 102 to an input of a second microfluidic chamber 102. In such a device the second microfluidic chamber has a second inlet, and the second inlet is configured to controllably pass a second series of individual droplets into the second microfluidic chamber 102.

In other embodiments, the optical switch can also include various channels, pumps, valves, and control circuitry designed to facilitate the optical switching, and more specifically the flow of the liquids through the microfluidic chamber 102. For example, the optical switch 100 can additionally comprise an outlet coupled to the microfluidic chamber 102, the outlet configured to controllably pass the series of individual droplets of the first liquid out of the microfluidic chamber. In one example the series of droplets are passed to a collection reservoir where the fluids can be separated and/or processed to allow their reuse.

The various embodiments of the optical switch that are described can be implemented for a variety of different applications. For example, the optical switch can be applied to the fields of telecommunications, system-on-chip, diagnostics, research, and/or other applications that require rapid, deterministic, low optical power, low-voltage light path switching.

Turning to FIGS. 2A and 2B, a simplified schematic view of an optical switch 200 is illustrated, with FIG. 2B illustrating a cross-sectional view taken along line 2B-2B in FIG. 2A. The optical switch 200 includes a microfluidic chamber 202, a first droplet generator 204, a second droplet generator 206, an inlet 208, an outlet 210, and a collection reservoir 212. In this illustrated embodiment the microfluidic chamber includes one optical input 214 and two optical outputs 216. In general, the optical switch 200 operates by controllably passing droplets of liquid from the first droplet generator 204 and for the second droplet generator 206 through the microfluidic chamber 202. Specifically, the droplets of liquid are controllably passed through the microfluidic chamber 202 to switch light between different light outputs 216.

As one example, the inlet 208 is configured to receive and controllably pass a series of individual droplets of a first liquid from the first droplet generator 204. Each drop generated by the droplet generator 204 is separated from other droplets of the first liquid. As this series of separated individual droplets is passed through the microfluidic chamber 202 the microfluidic chamber 202 switches from containing the first liquid to not containing the first liquid. Furthermore, the microfluidic chamber 202 is configured such that light entering the microfluidic chamber 202 from the optical input 214 passes to a first of the plurality of optical outputs 216 when a droplet of the first liquid is in the microfluidic chamber 202, and passes to a second of the plurality of optical outputs when a droplet of the first liquid is not in the microfluidic chamber 202. Thus, the optical switch 200 can switch the light from one output to another of light outputs 216 by controllably passing droplets of liquid through the microfluidic chamber 202.

Figure 3:
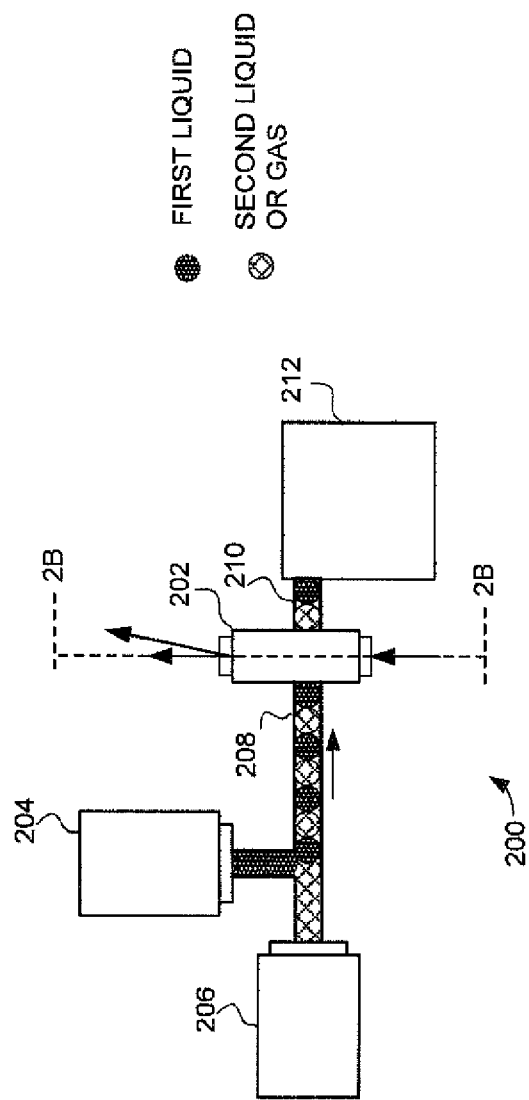
FIG. 3 is a schematic diagram of an optical switch in operation according to an embodiment of the invention.

Turning to FIG. 3, the optical switch 200 is illustrated showing the droplets of the first liquid passing from the first droplet generator 204 through the inlet 208 and into the microfluidic chamber 202. In this example each individual droplet of the first liquid is separated by droplets of a second liquid or gas. For example, by interlacing the first series of individual droplets with the second series of individual droplets, and controllably passing the interlaced first and second series of individual droplets into the microfluidic chamber 202. This can be accomplished by emulsifying the first liquid with the second liquid, thereby creating alternating series of droplets that are controllably passed into the microfluidic chamber 202. In one such embodiment, each series of droplets is in the form of a monodisperse emulsion. Specifically, the first droplet generator 204 provides a stream of the first liquid that merges into the stream or the second liquid or gas, thereby creating an interlacing of the first liquid with the second liquid or gas. And again, the microfluidic chamber 202 would be configured such that light entering the microfluidic chamber 202 from the optical input passes to a first of the plurality of optical outputs when a droplet of the first liquid is in the microfluidic chamber and passes to a second of the plurality of optical outputs when second liquid or gas is in the microfluidic chamber 202.

Turning to FIGS. 4A and 4B, a simplified schematic view of an optical switch 400 is illustrated, with FIG. 4B illustrating a cross-sectional view taken along line 4B-4B in FIG. 4A. The optical switch 400 includes a microfluidic chamber 402, a first droplet generator 404, a second droplet generator 406, a third droplet generator 407, an inlet 408, an outlet 410, and a collection reservoir 412. In this illustrated embodiment the microfluidic chamber includes one optical input 414 and three optical outputs 416. In general, the optical switch 400 operates by controllably passing droplets of liquid from the first droplet generator 404, the second droplet generator 406, and the third droplet generator 407 through the microfluidic chamber 402. Specifically, the droplets of liquid are controllably passed though the microfluidic chamber 402 to switch light between different light outputs 416.

As one example, the inlet 408 is configured to receive and controllably pass series of interlaced droplets from the three droplet generators. In this case each droplet in the series is separated by two other droplets. As this interlaced series of separated individual droplets is passed through the inlet 408 and the microfluidic chamber 402, the chamber 402 switches from containing the first liquid to the second liquid and then to the third liquid.

In this illustrated example, the microfluidic chamber 402 is configured such that light entering the microfluidic chamber 402 from the optical input 414 passes to a first of the plurality of optical outputs 416 when a droplet of the first liquid is in the microfluidic chamber 402, passes to a second of the plurality of optical outputs 416 when a droplet of the second liquid is in the microfluidic chamber 402, and passes to a third of the plurality of optical outputs 416 when a droplet of the third liquid is in the microfluidic chamber 402. Thus, the optical switch 400 can switch the light from one output to another of the three light outputs 416 by controllably passing droplets of liquid through the microfluidic chamber 402.

Figure 5:
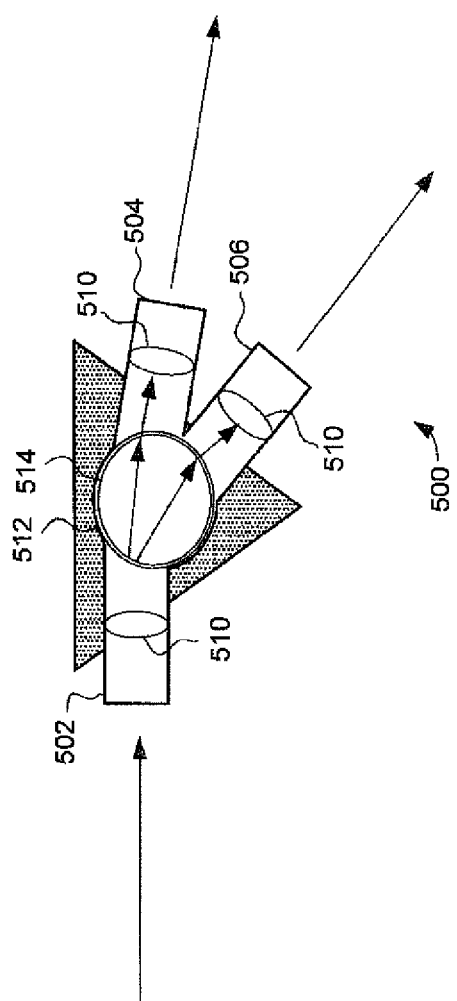
FIG. 5 is a schematic diagram of a microfluidic chamber according to an embodiment of the invention.

Turning to FIG. 5, a cross-sectional side view of a microfluidic chamber 500 is illustrated. The microfluidic chamber 500 includes an optical input 502, a first optical output 504 and a second optical output 506. Also included are conditioning lenses 510 in the optical input 502 and outputs 504 and 506. The microfluidic chamber 500 includes an interior cavity 512 configured to receive series of interlaced droplets 514 from one or more droplet generators. In this illustrated example, the microfluidic chamber 500 is configured such that light entering the microfluidic chamber 500 from the optical input 502 passes to either the first optical output 504 or the second optical output 506 based on the presence and refraction of the droplet 514 in the interior cavity 512. As one example, the light is refracted to the first optical output 504 when a droplet 514 of a first liquid is the cavity 512 and refracted to the second optical output 506 when a droplet 514 of a second liquid is in the cavity 512. Thus, the microfluidic chamber 500 can be used to switch the light from one output to another by controllably passing droplets 514 of liquid through the cavity 512.

As described above, a variety of different types of liquid/liquid and liquid/gas emulsions can be used in the optical switches. In general, the liquids are selected to have an appropriate index of refraction for the type of light that will be switched with the switch. In most cases the index of refraction of different gases does not vary significantly. Thus, air or other such common gases and gas mixtures may be used. Thus, as examples, a first liquid will be selected to cause refraction to the first output, and a second liquid will be selected to cause refraction to the second output. Also, the liquids will generally be selected to have appropriate optical clarity for the light that is to be switched. Additionally, the liquids will generally be selected to have appropriate properties, such as wetting, density, viscosity, surface tension, and immiscibility. These properties are preferably selected such that a series of drops of the liquid can be generated and interlaced with the other liquids and/or gases. Additionally, the liquids would be typically selected to properly move as a bubble through the inlet and into and out of the microfluidic chamber. Finally, the liquids would typically be selected to form the appropriate surface shapes in the chamber to cause the desired refraction.

The liquids can be additionally selected to preferentially transmit certain spectral bands of light appropriate to the application. As one example, air and water would be suitable for visible light switching whereas a liquid such as dichloromethane may be more suitable for the wavelengths used in telecommunications devices. Conversely, liquids may be chosen in order to preferentially absorb or attenuate certain spectral bands where the application requires. In this case the optical switch can also function as a switchable filter.

The embodiments that described thus provide techniques for optical switching that obviate and address various challenges in the related art. These devices and methods can be used to improve the effectiveness of a wide variety of different optical systems and techniques. One embodiment provides a device and method for optical switching using a microfluidic chamber and droplets of liquid. Specifically, the droplets of liquid are controllably passed through the microfluidic chamber to switch the passing of light between different optical outputs. Thus, the optical switch can switch the light from one output to another by controllably passing droplets of liquid through the microfluidic chamber.

This disclosure is provided in an exemplary form with a certain degree of particularity, and describes the best mode contemplated of carrying out the invention to enable a person skilled in the art to make or use embodiments of the invention. Those skilled in the art will understand, however, that various modifications, alternative constructions, changes, and variations can be made in the system, method, and parts and steps thereof, without departing from the spirit or scope of the invention. Hence, the disclosure is not intended to be limited to the specific examples and designs that are described. Rather, it should be accorded the broadest scope consistent with the spirit, principles, and novel features disclosed as generally expressed by the following claims and their equivalents.

What is claimed is:

1. A microfluidic optical switch, comprising:
a microfluidic chamber;
an optical input coupled to the microfluidic chamber;
a plurality of optical outputs coupled to the microfluidic chamber; and
an inlet coupled to the microfluidic chamber, the inlet configured to controllably pass a series of individual droplets of a first liquid into the microfluidic chamber, with each droplet separated from other of the series of individual droplets of the first liquid by gas or droplets of a second liquid,
wherein the microfluidic chamber, the optical input, and the plurality of optical outputs are configured such that light entering the microfluidic chamber from the optical input passes to a first of the plurality of optical outputs when a droplet of the first liquid is in the microfluidic chamber and passes to a second of the plurality of optical outputs when a droplet of the first liquid is not in the microfluidic chamber.

2. The microfluidic optical switch of claim 1 further comprising an outlet coupled to the microfluidic chamber, the outlet configured to controllably pass the series of individual droplets of the first liquid out of the microfluidic chamber.

3. The microfluidic optical switch of claim 1, wherein the droplets in the series of individual droplets of the first liquid are each separated by droplets of a second liquid, and wherein the inlet is coupled to a first fluid input and a second fluid input, the first fluid input configured to receive the first liquid and the second fluid input configured to receive the second liquid.

4. The microfluidic optical switch of claim 1, wherein the droplets in the series of individual droplets of the first liquid are each separated by droplets of a second liquid, and wherein the droplets in the series of individual droplets of the first liquid are additionally each separated by droplets of a third liquid.

5. The microfluidic optical switch of claim 1, wherein the droplets in the series of individual droplets of the first liquid are each separated by droplets of a second liquid, and wherein the first liquid and the second liquid have different indices of refraction.

6. The microfluidic optical switch of claim 1, wherein the optical input and the plurality of optical outputs each include conditioning optics.

7. The microfluidic optical switch of claim 6 further comprising an input optical waveguide coupled to the optical input and a plurality of output optical waveguides coupled to the plurality of optical outputs.

8. The microfluidic optical switch of claim 1, wherein the microfluidic chamber is constructed monolithically using photolithography.

9. The microfluidic optical switch of claim 1, wherein the microfluidic chamber includes a coating configured to alter affinity for the first liquid in the microfluidic chamber.

10. The microfluidic optical switch of claim 1, wherein the inlet is additionally coupled to a first droplet generator, the first droplet generator configured to generate the series of individual droplets of the first liquid.

11. The microfluidic optical switch of claim 10, wherein the inlet is additionally coupled to a second droplet generator, the second droplet generator configured to generate a series of individual droplets of a second liquid.

12. The microfluidic optical switch of claim 1, wherein at least one of the plurality of optical outputs is coupled to a second microfluidic chamber, and wherein the second microfluidic chamber is coupled to a second plurality of optical outputs and a second inlet and wherein the second inlet is configured to controllably pass a second series of individual droplets of the first liquid into the second microfluidic chamber.

13. A microfluidic optical switch, comprising:
a microfluidic chamber;
an optical input coupled to the microfluidic chamber;
a first optical output coupled to the microfluidic chamber;
a second optical output coupled to the microfluidic chamber;
a first droplet generator configured to generate a first series of individual droplets of a first liquid, the first liquid having a first index of refraction;
a second droplet generator configured to generate a second series of individual droplets of a second liquid, the second liquid having a second index of refraction different than the first index of refraction;
an inlet coupled to the microfluidic chamber, the first droplet generator and the second droplet generator, the inlet configured to interlace the first series of individual droplets with the second series of individual droplets, the inlet further configured to controllably pass the interlaced first and second series of individual droplets into the microfluidic chamber,
wherein the microfluidic chamber, the optical input, and the plurality of optical outputs are configured such that light entering the microfluidic chamber from the optical input passes to a first of the plurality of optical outputs when a droplet of the first liquid is in the microfluidic chamber and passes to a second of the plurality of optical outputs when a droplet of the second liquid is in the microfluidic chamber.

14. A method for optically switching, the method comprising:
providing a microfluidic chamber coupled to an optical input and a plurality of optical outputs, the microfluidic chamber, the optical input, and the plurality of optical outputs configured such that light entering the microfluidic chamber from the optical input passes to a first of the plurality of optical outputs when a first liquid is in the microfluidic chamber and passes to a second of the plurality of optical outputs when the first liquid is not in the microfluidic chamber; and
controllably passing a series of individual droplets of the first liquid into the microfluidic chamber, with each droplet separated from other of the series of individual droplets of the first liquid by gas or droplets of a second liquid.

15. The method of claim 14 further comprising controllably passing the series of individual droplets of the first liquid out of the microfluidic chamber.

16. The method of claim 14, wherein the droplets in the series of individual droplets of the first liquid are each separated by droplets of a second liquid, and wherein the inlet is coupled to a first fluid input and a second fluid input, the first fluid input configured to receive the first liquid and the second fluid input configured to receive the second liquid.

17. The method of claim 14, wherein the droplets in the series of individual droplets of the first liquid are each separated by droplets of a second liquid, and wherein the droplets in the series of individual droplets of the first liquid are additionally each separated by droplets of a third liquid.

18. The method of claim 14, wherein the droplets in the series of individual droplets of the first liquid are each separated by droplets of a second liquid, and wherein the first liquid and the second liquid have different indices of refraction.

19. The method of claim 14, wherein the optical input and the plurality of optical outputs each include conditioning optics.

20. The method of claim 19 further comprising an input optical waveguide coupled to the optical input and a plurality of output optical waveguides coupled to the plurality of optical outputs.

21. The method of claim 14, wherein the microfluidic chamber is constructed monolithically using photolithography.

22. The method of claim 14, wherein the microfluidic chamber includes a coating configured to alter affinity for the first liquid in the microfluidic chamber.

23. The method of claim 14, wherein at least one of the plurality of optical outputs is coupled to a second microfluidic chamber, and wherein the second microfluidic chamber is coupled to a second plurality of optical outputs and a second inlet and wherein the second inlet is configured to controllably pass a second series of individual droplets of the first liquid into the second microfluidic chamber.

* * * * *